(12) United States Patent
Bonucci et al.

(10) Patent No.: US 10,333,168 B2
(45) Date of Patent: *Jun. 25, 2019

(54) CARBON DIOXIDE COMPOSITE GETTER

(71) Applicant: SAES GETTERS S.p.A., Lainate (MI) (IT)

(72) Inventors: Antonio Bonucci, Hamburg (DE); Alessandra Fernicola, Rome (IT); Marco Visconti, Desenzano del Garda (IT)

(73) Assignee: SAES GETTERS S.P.A., Lainate (IT)

( * ) Notice: Subject to any disclaimer, the term of this patent is extended or adjusted under 35 U.S.C. 154(b) by 178 days.

This patent is subject to a terminal disclaimer.

(21) Appl. No.: 15/038,019

(22) PCT Filed: Dec. 12, 2014

(86) PCT No.: PCT/IB2014/066845
§ 371 (c)(1),
(2) Date: May 19, 2016

(87) PCT Pub. No.: WO2015/101857
PCT Pub. Date: Jul. 9, 2015

(65) Prior Publication Data
US 2016/0301099 A1   Oct. 13, 2016

(30) Foreign Application Priority Data

Dec. 30, 2013   (IT) .............................. MI2013A2216

(51) Int. Cl.
*H01M 10/0525* (2010.01)
*H01M 10/34* (2006.01)
(Continued)

(52) U.S. Cl.
CPC ........ *H01M 10/0525* (2013.01); *B01D 53/02* (2013.01); *B01D 53/22* (2013.01);
(Continued)

(58) Field of Classification Search
CPC ............ B01D 2251/30; B01D 2251/40; B01D 2253/108; B01D 2257/504;
(Continued)

(56) References Cited

U.S. PATENT DOCUMENTS 3,684,712 A   8/1972   Bovard et al.
7,314,847 B1  1/2008   Siriwardane
(Continued)

FOREIGN PATENT DOCUMENTS

GB   2230248 A    10/1990
JP   2003077549 A  3/2003
(Continued)

OTHER PUBLICATIONS

International Search Report and Written Opinion for PCT/IB2014/066845 filed Dec. 12, 2014 on behalf of SAES GETTERS S.P.A. dated Mar. 30, 2015. 10 pages.
(Continued)

*Primary Examiner* — Carlos Barcena
(74) *Attorney, Agent, or Firm* — Steinfl + Bruno LLP

(57) ABSTRACT

A carbon dioxide composite getter comprising a $CO_2$-permeable envelope containing powders of two active materials and sealed systems employing the carbon dioxide composite getter.

20 Claims, 1 Drawing Sheet

Figure 1:
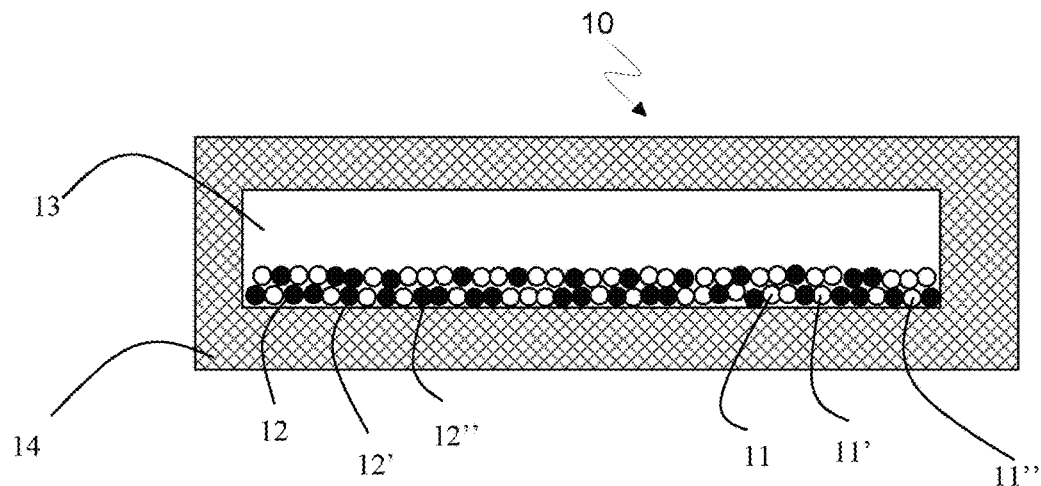

(51) Int. Cl.

| | |
|---|---|
| *H01M 10/52* | (2006.01) |
| *B01D 53/26* | (2006.01) |
| *B01D 53/22* | (2006.01) |
| *H01G 11/06* | (2013.01) |
| *H01G 11/80* | (2013.01) |
| *H01G 11/20* | (2013.01) |
| *B01D 53/02* | (2006.01) |
| *H01G 11/78* | (2013.01) |

(52) U.S. Cl.
CPC .......... *B01D 53/261* (2013.01); *H01G 11/06* (2013.01); *H01G 11/20* (2013.01); *H01G 11/78* (2013.01); *H01G 11/80* (2013.01); *H01M 10/34* (2013.01); *H01M 10/52* (2013.01); *B01D 2251/30* (2013.01); *B01D 2251/40* (2013.01); *B01D 2253/108* (2013.01); *B01D 2257/504* (2013.01); *B01D 2257/80* (2013.01); *Y02C 10/08* (2013.01); *Y02E 60/13* (2013.01)

(58) Field of Classification Search
CPC .... B01D 2257/80; B01D 53/02; B01D 53/22; B01D 53/261; H01M 10/0525; H01M 10/34; H01M 10/52; Y02C 10/08
See application file for complete search history.

(56) References Cited

U.S. PATENT DOCUMENTS

| | | | |
|---|---|---|---|
| 9,114,382 B2* | 8/2015 | Visconti ................. | H01G 11/06 |
| 2005/0160913 A1 | 7/2005 | Hrycak et al. | |
| 2006/0037478 A1 | 2/2006 | Mori et al. | |
| 2010/0173192 A1* | 7/2010 | Toia ................... | H01M 2/0257 |
| | | | 429/164 |
| 2010/0183914 A1* | 7/2010 | Toia ................... | H01M 10/052 |
| | | | 429/178 |
| 2011/0113959 A1* | 5/2011 | Bonucci ............ | B01J 20/28004 |
| | | | 95/117 |
| 2014/0186663 A1* | 7/2014 | Hiroki ................. | H01M 10/52 |
| | | | 429/57 |

FOREIGN PATENT DOCUMENTS

| WO | 2008/148778 A1 | 12/2008 |
|---|---|---|
| WO | 2008/148781 A1 | 12/2008 |
| WO | 2014/009855 A2 | 1/2014 |
| WO | 2014/009855 A3 | 1/2014 |

OTHER PUBLICATIONS

Second Written Opinion for PCT/IB2014/066845 filed Dec. 12, 2014 on behalf of SAES GETTERS S.P.A. dated Dec. 8, 2015. 4 pages.

International Preliminary Report on Patentability for PCT/IB2014/066845 filed Dec. 12, 2014 on behalf of SAES GETTERS S.P.A. dated Apr. 5, 2016. 6 pages.

Kong, W. et al. "Gas evolution behaviors for several cathode materials in lithium-ion batteries" Journal of Power Sources, Dec. 2004, vol. 152, 2005, pp. 285-291.

Todd, W. "Variables that Affect/Control High Density Polyethylene Film Oxygen/Moisture Barrier" presented at ANTEC 2003, May 4-8, 2003. 9 pages.

Shin, J-S. et al. "Effect of $Li_2CO_3$ additive on gas generation in lithium-ion batteries" Journal of Power Sciences, Jan. 2002, vol. 109, pp. 47-52.

Vetter, J. et al. "In situ study on CO2 evolution at lithium-ion battery cathodes" Journal of Power Sciences, Jun. 14, 2006, vol. 159, pp. 277-281.

* cited by examiner

CARBON DIOXIDE COMPOSITE GETTER

CROSS REFERENCE TO RELATED APPLICATIONS

The present application is the US national stage of International Patent Application PCT/IB2014/066845 filed internationally on Dec. 12, 2014, which, in turn, claims priority to Italian Patent Application No. MI2013A002216 filed on Dec. 30, 2013.

The present invention in a first aspect thereof is inherent to an improved carbon dioxide composite getter and in a second aspect thereof to sealed systems employing such an improved carbon dioxide composite getter.

Nowadays there is a whole class of sealed systems where the presence of carbon dioxide is detrimental, both in terms of negative impact due to chemical interactions of the carbon dioxide with one or more components present in the sealed system, or as a consequence of a physical interaction. Non-limiting examples of systems negatively affected by chemical interactions are organic electronic devices, while examples of the latter type of devices where is the physical interaction to determine a device deterioration, are typically the ones where $CO_2$ is produced by the systems themselves as a side effect of their operation, and this may lead to overpressure and consequent rupture of the device case.

Among the most important devices of these types there are the energy storage systems such as rechargeable lithium batteries, and the detrimental role and risks posed by $CO_2$ are described in various articles such as "In situ study on $CO_2$ evolution at lithium-ion battery cathodes", by Vetter et al., published in the Journal of Power Sources 159 (2006) 277-281, "Gas evolution behaviors for several cathode materials in lithium-ion batteries", by Kong, published in the Journal of Power Sources 142 (2005) 285-291 and "Effect of $Li_2CO_3$ additive on gas generation in lithium-ion batteries", by Shin et al, published in the Journal of Power Sources 109 (2002) 47-52.

Rechargeable lithium batteries are among the most critical devices since carbon dioxide overpressure may lead to sudden rupture of the device case with the risk of leakage of flammable substances (the electrolytes contained therein). This problem is also enhanced by the fact that typically the free volume in these devices is very small, whereby the generation of low quantities of carbon dioxide will lead to a quick rise in the device internal pressure.

In the following, reference will be made specifically to the use of $CO_2$ getter systems in this type of devices in view of this particular critical aspect, even though, as outlined above, the presence of $CO_2$ and consequently the need for its efficient removal is shared by many different sealed systems.

The problem of the removal of gaseous impurities in lithium batteries is described and addressed in WO 2008/148778 and WO 2008/148781, both in the applicant's name. In these documents the main aspect addressed is the compatibility of the getter materials with the electrolytic environment of the battery. One of the problems described in these documents with regards to the use of alkali metal hydroxide for $CO_2$ removal is the concurrent release of $H_2O$ and therefore the need to remove it in order to avoid a shifting of the problem from carbon dioxide to $H_2O$. This leads to bulkier systems or systems that have a limited capacity for $CO_2$, since a significant part of the available volume needs to be taken up by the moisture absorber.

The purpose of the present invention is to provide an improved carbon dioxide composite getter comprising a $CO_2$-permeable envelope, defining an internal volume V, that contains powders of at least a first and a second active material whose cumulative volume is Vm, said first active material being a hydroxide chosen from one or more of LiOH, NaOH, KOH, $Ca(OH)_2$, $Mg(OH)_2$, $Sr(OH)_2$ and said second active material being an oxide chosen from one or more of $Li_2O$, CaO, MgO, SrO and characterized in that the $CO_2$-permeable envelope has a permeation coefficient of at least 50 $cm^3*mm/(m^2*day*atm)$ and the ratio of the WVTR at 90% RH 38° C. to the WVTR at 85% RH 23° C. is less than 10.

By cumulative volume Vm it is meant the overall sum of the active materials (lithium oxide and lithium hydroxide) particles volume contained within the internal volume V defined by the $CO_2$-permeable envelope with the proper WVTR ratio. Sometimes in the technical filed the WVTR (Water Vapour Transmission Rate) is also called with MVTR (Moisture Vapour Transmission Rate).

In the following with $CO_2$-permeable envelope it is intended and meant an envelope possessing the required WVTR ratio (less than 10) as above expressed.

In the composite getter system according to the present invention the concentration of the first and second active materials, i.e. respectively the weight ratio of the first and second active material with respect to the overall weight (sum) of the active materials shall be at least 10%, i.e. the oxide/(oxide+hydroxide) weight ratio is comprised between 0.1 and 0.9.

When the second active material is mainly $Li_2O$ the weight concentration of $Li_2O$ is preferably comprised between 15% and 90%, more preferably between 25% and 70%.

When the second active material is mainly CaO the weight concentration of CaO is preferably comprised between 25% and 90%, more preferably between 30% and 60%.

When the second active material is mainly MgO the weight concentration of MgO is preferably comprised between 20% and 90%, more preferably between 25% and 60%.

When the second active material is mainly SrO the weight concentration of SrO is preferably comprised between 30% and 90%, more preferably between 35% and 70%.

The term "mainly" in the expressions above indicates the case in which the mentioned oxide is at least 60 wt % of the second active material, this percentage being with respect to the second active material composition.

Figure 2:
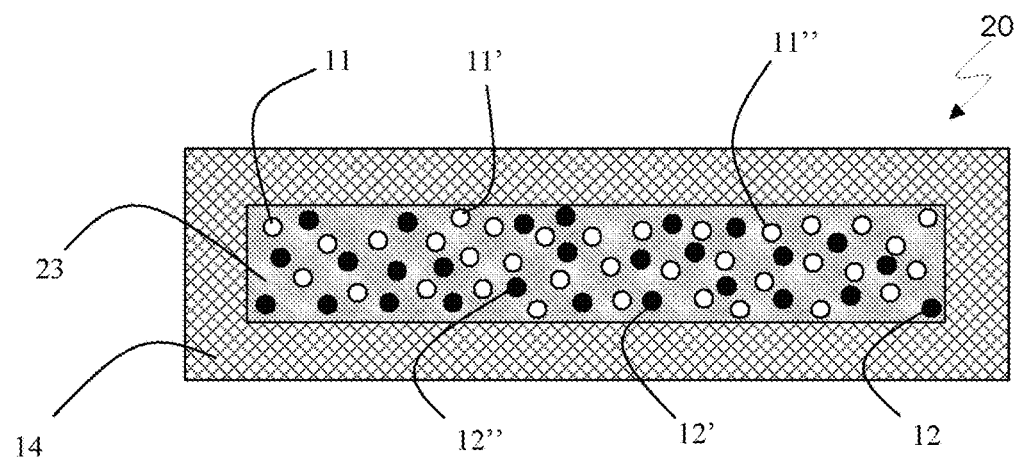

The invention will be also described with the help of the following figures where:

FIG. 1 shows a cross section view of a first embodiment of a $CO_2$ composite getter system according to the present invention, and FIG. 2 shows a cross section view of a second embodiment of a $CO_2$ composite getter system according to the present invention.

In the figures the dimensions and dimensional ratio of the depicted elements, with particular and non-exclusive reference to the dimensions of the active material particles, are not correct but have been altered in order to improve their readability.

The inventors have surprisingly and unexpectedly found that such combination of materials requires also additional conditions in order to be an effective $CO_2$ getter; in particular the novel combination of active materials according to the present invention shall be confined in a volume, smaller than the volume of the sealed device, by means of a $CO_2$-permeable envelope. Such volume, together with the characteristic and behavior of the $CO_2$-permeable envelope provides the appropriate environment for $CO_2$ capture. This need has been previously addressed in U.S. PGPub US 2015/0017489A1 (now U.S. Pat. No. 9,114,382), which corresponds to the international patent application PCT/IB2013/055422 (published as WO 2014/009855 A2) in the applicant's name, whose teachings are herein incorporated by reference. This application has some elements in common with the present invention, in particular the $Li_2O$/LiOH material combination and the presence of a volume sealed with a $CO_2$-permeable envelope but differs for the requirements in terms of WVTR ratio of the permeable envelope. In addition, U.S. Patent No. 9,114,382 teaches that the $CO_2$-permeable envelope exhibits a moisture vapor transmission rate (WVTR) not higher than 0.6 g*mm/($m^2$*day).

As in the above-mentioned application WO 2014/009855, there are two main embodiments for the carbon dioxide composite getter according to the present invention.

In a first embodiment the first active material (hydroxide) and the second active material (oxide) are both in the form of powders and are mixed together and put into a $CO_2$-permeable "pouch" with the correct WVTR ratio that is sealed, for example, by heating.

In a preferred solution the ratio of the active material volume Vm to the getter system internal volume V is comprised between 0.15 and 0.9.

In a second embodiment the $CO_2$ composite getter comprises a dispersion in a suitable polymeric binder of the first active material (hydroxide) and of the second active material (oxide) in the correct ratio, as above defined, which binder is in contact with a $CO_2$-permeable envelope with the proper WVTR ratio, as per definition provided above. In this case it is possible that the $CO_2$-permeable envelope, although defining an internal volume V, does not completely surround the polymeric binder, i.e. a small portion of the binder containing the first and second active materials is not covered by the envelope. In fact in this case also the binder defines the internal volume V. It is important that only a small fraction of the binder is not covered/coated with the $CO_2$-permeable envelope, i.e. 95% or higher of the polymeric binder surface is encased by the $CO_2$-permeable envelope. It is important to remark that the internal volume in this case is equivalently and sufficiently defined both by the envelope covering at least 95% of the surface area of the binder and therefore defining an internal volume presenting a small aperture, as well as the binder with the active material powders that represents the internal volume.

Even though a small aperture in the $CO_2$-permeable envelope is tolerable and does not impair significantly the technical features of the composite getters, it is preferred also in this case to have a closed envelope, as per the use of the active materials in powders form (without the binder).

In this embodiment the level of loading of the powders into the polymeric binder assures the presence of an optimized "reaction volume" for the powders of the two active materials and in particular this condition is achieved when the overall loading level for the first active material and second active material powders into the polymeric binder is comprised between 20 and 60 wt %, and preferably comprised between 40 and 50 wt %.

Therefore with the getter systems according to the present invention the additional element for $H_2O$ removal is actually a "precursor" for the $CO_2$ adsorber, resulting in a system having a higher capacity with respect to systems associating an hydroxide chosen from LiOH, NaOH, KOH, $Ca(OH)_2$, $Mg(OH)_2$, $Sr(OH)_2$ with a generic moisture removing material. At the same time the structure of the getter system according to the present invention is one that while providing a suitable reaction volume renders the $CO_2$ sorption characteristics suitable to control the pressure within sealed devices, by providing a good capacity coupled with an appropriate reaction kinetics.

A cross-sectional view of a composite $CO_2$ getter system 10 according to the present invention is shown in FIG. 1, showing particles of the second active material (oxide) 11, 11', 11" (white circles), and of the first active material (hydroxide) 12, 12', 12" (black circles), surrounded by a $CO_2$-permeable envelope 14. The system 10 presents an internal free volume 13 (indicated in white).

Oxide particles and hydroxide particles are represented as circles even though in reality and in the most common cases their shape is not regular. Also the getter system 10 has been depicted with a regular and rectangular shape, but any shape is possible, since the object of the present invention is a system containing mixed powders of two active materials (oxide and hydroxide as above listed) enclosed in a suitable envelope defining a volume V, only partially filled by such powders.

FIG. 2 shows a cross-sectional view of an alternate embodiment of a composite getter system 20 in which, differently from the system shown in FIG. 1, the oxide particles 11, 11', 11" and hydroxide particles 12, 12', 12" are dispersed in a polymeric binder 23, indicated in grey.

The systems shown in FIG. 1 and FIG. 2 are therefore different from what is described in the U.S. Pat. No. 3,684,712 that discloses granules of lithium oxide surrounded by a shell of an alkaline-earth metal oxide, the differences residing both in the nature of the materials, with reference to the materials associated to lithium hydroxide, and in the configurations, since U.S. Pat. No. 3,684,712 discloses composite granules and not a dispersion in a suitable binder enclosed in a permeable envelope.

In both preferred embodiments according to the present invention the employed powders have dimensions that are usually determined and controlled by means of a sieving operation and, owing also to the geometrical conformation of the powders (not regular/spherical), this ensures that are selected and employed all the powders that have a minimal size lesser than the sieve opening.

In the present invention, for both active materials when they are employed as such, are usefully employed particles/powders whose minimal size is higher than 1 μm. In case of getter powders dispersed in a polymeric binder, such as in the embodiment shown in FIG. 2, the preferred powders distribution is comprised between 1 and 250 μm (minimal size of the powders), this allow for an easier manufacturability of systems with the desired thicknesses.

As already described above, any polymer having a $CO_2$ permeation coefficient of 50 $cm^3$*mm/($m^2$*day*atm) and a ratio of the WVTR at 90% RH 38° C. to the WVTR at 85% RH 23° C. lower than 10 is suitable to carry out the invention. It is important to remark that the above condition is not unequivocally linked to the type of polymer, but additives or morphological characteristics of the envelope may alter the ratio, therefore not rendering the polymer apt to be used according to the present invention. So it is important to test the polymeric envelope according to the ASTM procedures ASTM F-1249 for the WVTR ratio determination.

The thickness of the carbon dioxide permeable envelope is usefully comprised between 5 and 500 μm. It is to be underlined that such thickness represents the mean value, since certain points of the envelope (sealing regions) may present a different thickness (typically higher).

The thickness of the binder containing the powders shall be comprised between 50 and 400 pm, and in any case shall not be less than at least 1.5 times the minimum dimension of the employed powders. Suitable binder materials are for example High Density Polyethylene (HDPE), Polypropylene (PP), Low Density Polyethylene (LDPE), copolymer ethylene-octene, polyolefin modified with maleic anhydride, Ethylene Vinyl Acetate (EVA), Styrene-Ethylene-Butadiene-Styrene (SEBS), Ethylene Propylene Diene Monomer (EPDM), Thermoplastic Elastomer (TPE) and combinations thereof.

As outlined above when the composite getter systems according to the present invention are used and placed within the sealed systems, there is a continuous shift in the ratio between hydroxide and oxide, with the former becoming more and more preponderant toward the end of the system.

So the active material ratio for the preferred getter systems according to the present invention is to be evaluated, considered and determined for a "fresh" getter system, i.e. a getter system not yet exposed to high levels of $CO_2$ (and therefore consumed).

A preferred solution for the getter system according to the present invention envisions the use of a drying element, that advantageously is made by a dispersion of a moisture sorber in a suitable binder, e.g. a polymeric matrix. This further ensures that toward the end of the life there is no moisture release from the $CO_2$ getter system. It is to be underlined that the amount of the moisture sorber added in this case is much smaller than in other conventional systems when the hydroxide is associated with another moisture-sorbing element.

In particular the following configurations for the sealing element of the getter system are possible:
- powders of the moisture sorber directly dispersed in the external envelope (1-layer system)
- powders of the moisture sorber dispersed in an additional layer external to the $CO_2$-permeable envelope (2-layers system)
- powders of the moisture sorber dispersed in an additional layer external to the $CO_2$-permeable envelope that is shielded from the device environment by means of another polymeric layer (3-layers system).

Suitable materials for the $H_2O$ removal are for example aluminosilicates, such as zeolite.

In a second aspect thereof the invention consists in a sealed system containing an improved $CO_2$ composite getter comprising a $CO_2$-permeable envelope having an internal volume V, containing powders of a first and a second active material, said first active material being a hydroxide chosen from one or more of LiOH, NaOH, KOH, $Ca(OH)_2$ $Mg(OH)_2$, $Sr(OH)_2$ and said second active material being an oxide chosen from one or more of $Li_2O$, CaO, MgO, SrO, and characterized in that the $CO_2$-permeable envelope has a permeation coefficient of at least 50 $cm^3*mm/(m^2*day*atm)$ and the ratio of the WVTR at 90% RH 38° C. to the WVTR at 85% RH 23° C. is less than 10. A preferred sub-range for the above mentioned WVTR ratio is equal to or less than 5.

In a preferred embodiment said sealed systems are energy storage devices such as rechargeable Li-Ion batteries and supercapacitors.

In an even more preferred embodiment the $CO_2$ getter system contains between 5 and 500 milligrams of active material powders, such quantity may be higher and scale up depending also on the size of the sealed system, for example rechargeable Li-Ion batteries or supercapacitors may vary greatly in their internal volume and therefore need and can accommodate a higher quantity of getter material.

The invention will be further illustrated with the help of the following non-limiting example.

EXAMPLE 1

The WVTR values at 38° C. and 90% RH and at 23° C. and 85% RH obtained according to ASTM F-1249 for two 25 μm films of polyammide-nylon 6 and HDPE are reported in table 1:

| Sample | WVTR @ 38° C. 90% RH | WVTR @ 23° C. 85% RH | WVTR Ratio |
|---|---|---|---|
| Polyamide-Nylon 6 | 7.5 | 2.14 | 3.5 |
| HDPE | 0.15 | 0.06 | 2.5 |

It is possible to observe that both samples have the WVTR ratio below 10, and in particular below 5, that is the more preferred range for the present invention. So even though Polyamide-Nylon 6 is suitable to carry out the present invention, it is a polymer not included in the list of preferred materials disclosed in WO 2014/009855 which is further evidence that this invention covers and focuses on a different aspect with respect to the aforementioned patent application, owing also to the fact that the permeation/transmission properties of a polymeric material are not linked exclusively to its chemical nature. This fact is evidenced, for example, in the paper "Variables that affect/control high density polyethylene film oxygen/moisture barrier", by William Todd, presented at ANTEC 2003; so WO 2014/009855 does not disclose the polymeric envelopes for the carbon dioxide getters according to the present invention.

The invention claimed is:

1. A carbon dioxide composite getter, comprising:
a $CO_2$-permeable envelope, defining an internal volume, that contains powders of a first active material and a second active material defining a cumulative volume,
said first active material being a hydroxide chosen from one or more of LiOH, NaOH, KOH, $Ca(OH)_2$, $Mg(OH)_2$, $Sr(OH)_2$, and
said second active material being an oxide chosen from one or more of $Li_2O$, CaO, MgO, SrO,
wherein the $CO_2$-permeable envelope has a $CO_2$ permeation coefficient of at least 50 $cm^3*mm/(m^2*day*atm)$ and the ratio of the water vapor transmission rate at 90% RH 38° C. to the water vapor transmission rate at 85% RH 23° C. is less than 10, and
wherein the $CO_2$-permeable envelope exhibits a water vapor transmission rate not higher than 0.6 $g*mm/(m^2*day)$.

2. The carbon dioxide composite getter according to claim 1, wherein the weight concentration of the second active material is between 10% and 90%.

3. The carbon dioxide composite getter according to claim 2, wherein said second active material comprises $Li_2O$ and the weight concentration of $Li_2O$ is between 15% and 90%.

4. The carbon dioxide composite getter according to claim 2, wherein said second active material comprises CaO and the weight concentration of CaO is between 25% and 90%.

5. The carbon dioxide composite getter according to claim 2, wherein said second active material comprises MgO and the weight concentration of MgO is between 20% and 90%.

6. The carbon dioxide composite getter according to claim 2, wherein said second active material comprises SrO and the weight concentration of SrO is between 30% and 90%.

7. The carbon dioxide composite getter according to claim 1, wherein the first active material and the second active material are in the form of free powders, and wherein the ratio between the cumulative volume and the internal volume is between 0.15 and 0.9.

8. The carbon dioxide composite getter according to claim 7, wherein said free powders minimal size is higher than 1 µm.

9. The carbon dioxide composite getter according to claim 1, wherein said $CO_2$-permeable envelope has a thickness between 5 µm and 500 µm.

10. The carbon dioxide composite getter according to claim 1, further comprising a moisture sorber arranged outside said $CO_2$-permeable envelope.

11. The carbon dioxide composite getter according to claim 10, wherein said moisture sorber comprises a dispersion in a polymeric matrix of a moisture-removing material.

12. The carbon dioxide composite getter according to claim 1, wherein said powders of the first active material and the second active material are dispersed in a polymeric binder.

13. The carbon dioxide composite getter according to claim 12, wherein said polymeric binder is selected among High Density Polyethylene (HDPE), Polypropylene (PP), Low Density Polyethylene (LDPE), copolymer ethylene-octene, polyolefin modified with maleic anhydride, Ethylene Vinyl Acetate (EVA), Styrene-Ethylene-Butadiene-Styrene (SEBS), Ethylene Propylene Diene Monomer (EPDM), Thermoplastic Elastomer (TPE) and combinations thereof.

14. The carbon dioxide composite getter according to claim 12, wherein said powders of the first active material and the second active material minimal size is between 1 µm and 250 µm.

15. The carbon dioxide composite getter according to claim 12, wherein the content of said powders of the first active material and the second active material in said polymeric binder is comprised between 20 wt % and 60 wt %.

16. The carbon dioxide composite getter according to claim 12, wherein the thickness of the binder containing the powders of the first active material and the second active material is comprised between 50 µm and 400 µm, and in any case is not less than at least 1.5 times the minimum dimension of the employed powders.

17. The carbon dioxide composite getter according to claim 1, wherein the amount of said powders of the first active material and the second active material is between 5 milligrams and 500 milligrams.

18. A sealed system comprising a carbon dioxide composite getter according to claim 1.

19. The sealed system according to claim 18, wherein said system is an energy storage device.

20. The sealed system according to claim 18, wherein said system is a rechargeable Li-Ion battery or a supercapacitor.

* * * * *